Figure 1:
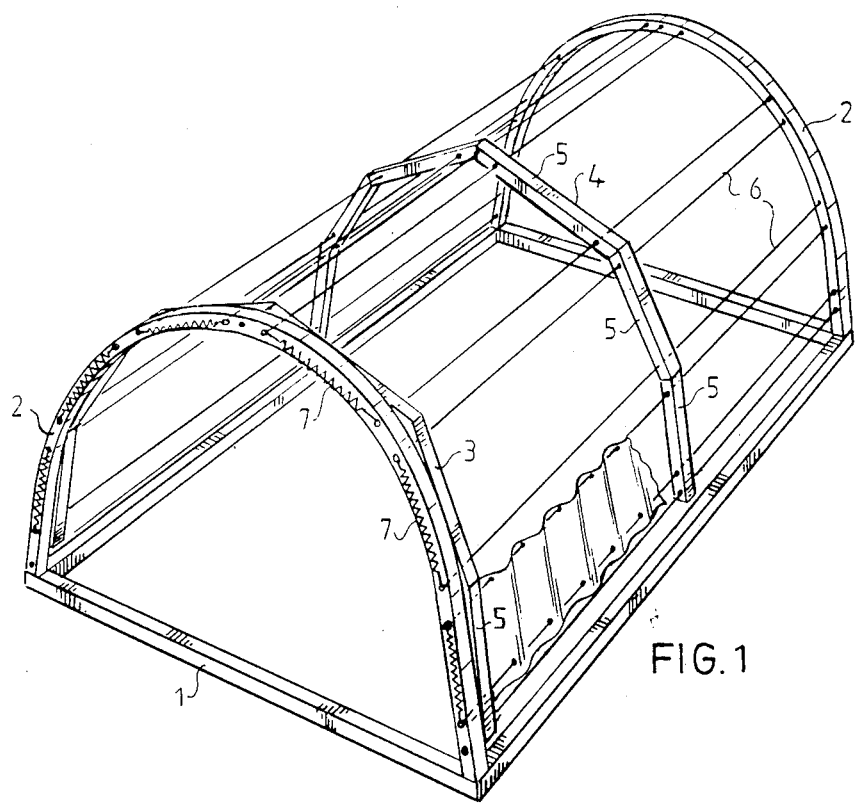

United States Patent [19]

Schön

[11] Patent Number: 4,979,551
[45] Date of Patent: Dec. 25, 1990

[54] SUNBLIND ASSEMBLED INTO AN ARCUATE FORM

[76] Inventor: Siegfried J. Schön, 3 Kwadestraat, 4871 NH Etten-Leur, Netherlands

[21] Appl. No.: 248,104

[22] Filed: Sep. 23, 1988

[51] Int. Cl.[5] ............................................. A47H 3/08
[52] U.S. Cl. ................................. 160/84.1; 160/88; 160/183
[58] Field of Search ............... 160/84, 84.1, 131, 132, 160/88, 183

[56] References Cited

U.S. PATENT DOCUMENTS

| | | | |
|---|---|---|---|
| 4,687,038 | 8/1987 | Clemente | 160/84.1 |
| 4,726,410 | 2/1988 | Fresh | 160/84.1 |
| 4,733,710 | 3/1988 | Haines | 160/84.1 |
| 4,739,816 | 4/1988 | Dodich et al. | 160/168.1 |

FOREIGN PATENT DOCUMENTS 570017 1/1924 France ............................ 160/131
598923 10/1925 France .

Primary Examiner—Blair M. Johnson

[57] ABSTRACT

A plurality of support bars are provided with at least one of the bars being movable relative to another of the bars. A plurality of separate webs of pleated material are provided with the opposite edges of each of the webs being secured to adjacent bars. A plurality of tensioning cords are provided, each of the cords extending between adjacent bars to support an associated web. Each of the tensioning cords is tensioned by spring means. When the blind is in closed position, the bars are spread apart and the webs are flattened to define a plurality of sections. The outer peripheries of the pleats of each section lie generally in a plane, the plane of each of the sections being disposed at an angle to the plane of an adjacent section so that each of the planes defines a chord of a curve.

10 Claims, 3 Drawing Sheets

SUNBLIND ASSEMBLED INTO AN ARCUATE FORM

The invention relates to a sunblind, consisting of a first and second support bar which can be moved relative to each other, having attached between them a web of material for keeping out the sun, this material being supported between the bars by one or more tensioning cords.

Known sunblinds function usually in a flat plane, for example along a vertical upright window or door opening, in order to more or less cover this opening. Because of the use of the tensioning cords it is not possible to guide the webs of material along an arcuate plane, so that for example skylights can also be screened off.

The invention has for its object to give the sunblind a form such that screening of curved or arcuate surfaces is then possible.

In accordance with a first embodiment the sunblind is distinguished in that each support bar takes an identically arcuate form and consists of straight parts arranged at an angle to one another, whereby fitted between each part is a separate web of material.

Owing to the use of the curved support bars it is possible to completely screen off a curved skylight by moving the support bars towards or away from each other, so that more or less of the surface of the skylight is screened by the web of material. The support bars can hereby be carried along a separate guiding, but, in accordance with a preferred embodiment, the tensioning cords are also guide cords for the support bars, which guide cords are disposed in a curving plane.

According to a second embodiment, whereby the sunblind is provided with two or more separate web portions which are connected to one another series-wise, this embodiment is distinguished in that arranged at least at one side of the assembled blind is a curved guiding for guiding at least one of the ends of the bars, whereby the tensioning cords are pre-tensioned between the bar pieces associated with each web portion by a spring-mounted member.

With this embodiment a flat circle segment can be covered, while an arcuate opening can also be screened.

The invention also extends to embodiments which are assembled from both the previously mentioned possible embodiments.

The web material is preferably a pleated material.

Figure 2:
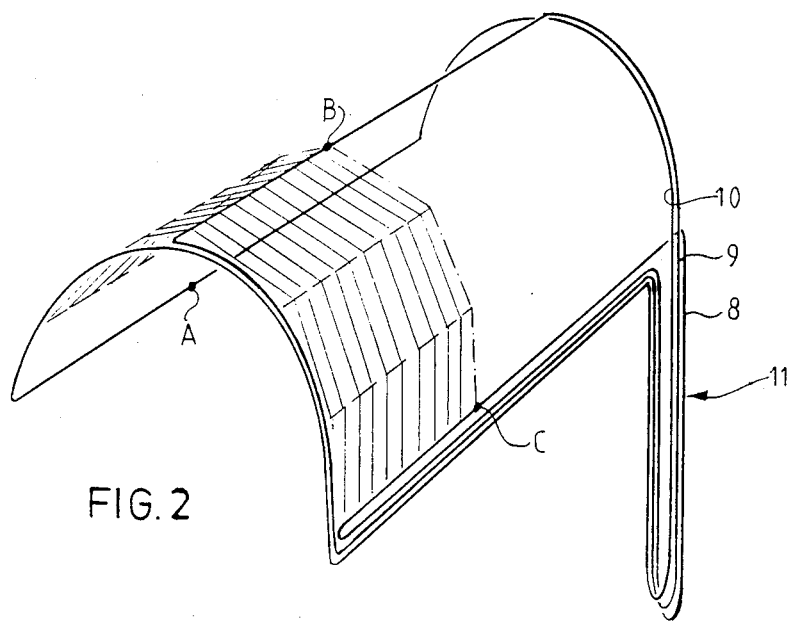
Figure 3:
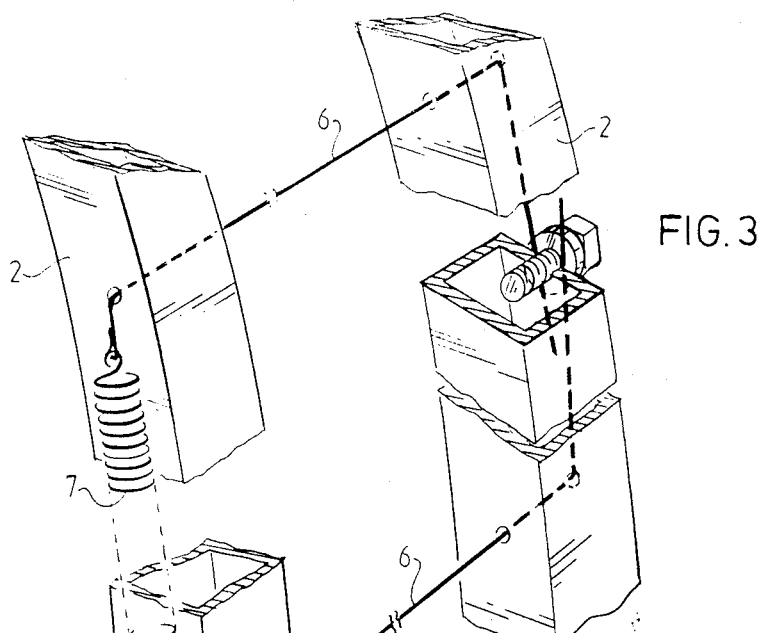
Figure 4:
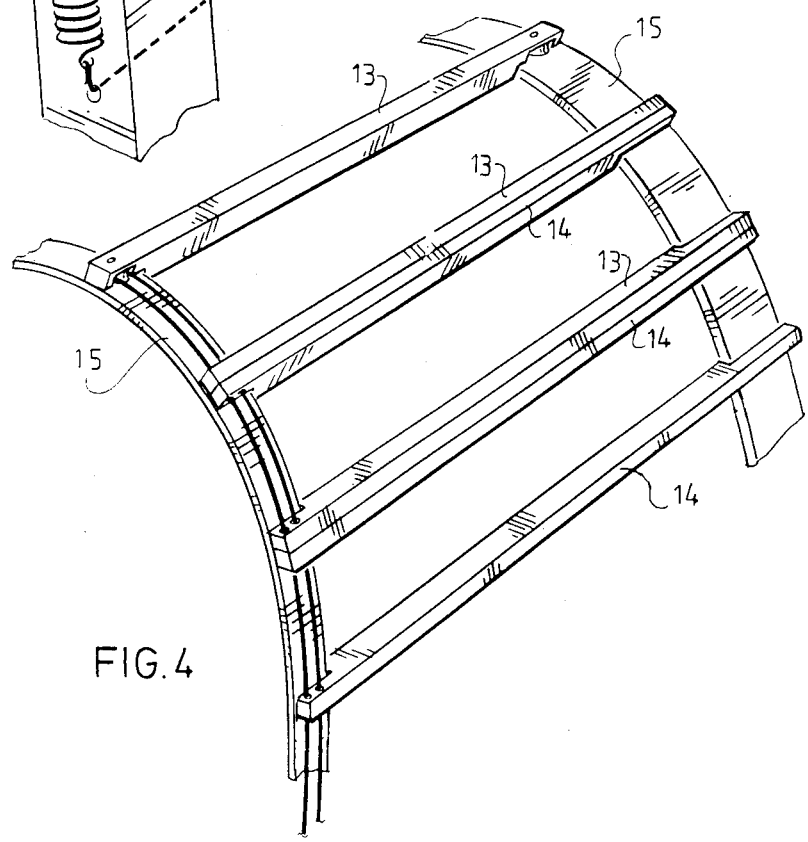
Figure 5:
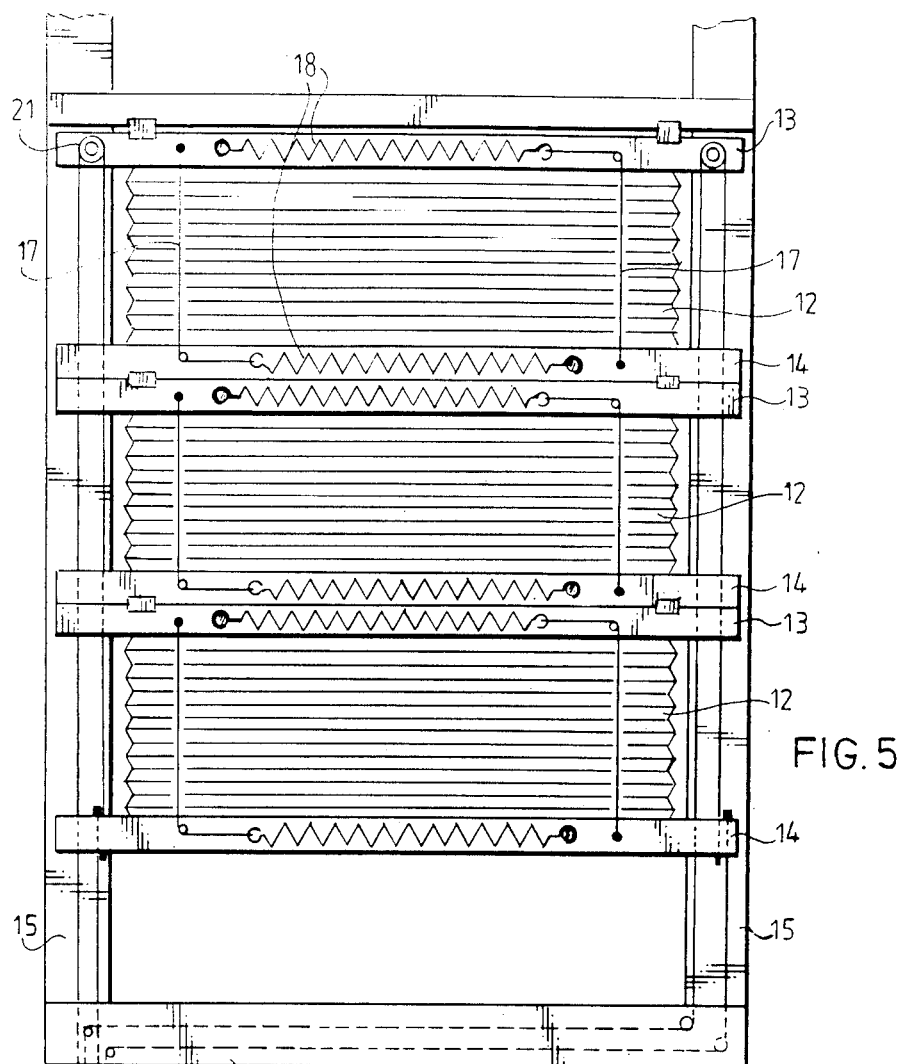
Figure 6:
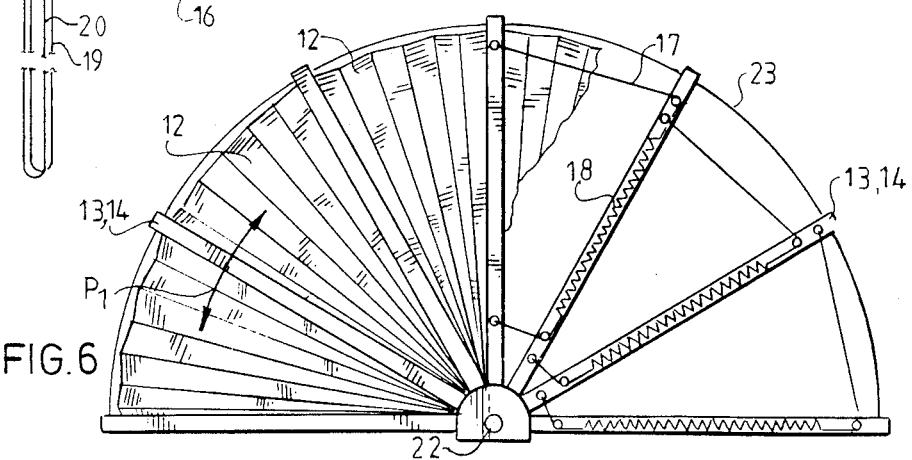

The invention is further elucidated in the figure description below of three embodiments. In the drawing:

FIG. 1 shows a perspective top view of a first embodiment, whereby the support bars display a curved form, FIG. 2 is a diagram associated with FIG. 1 of the running of the operating cords, FIG. 3 is a diagram associated with FIG. 1 of the running of a tensioning cord, FIG. 4 is a perspective top view of a portion of a second embodiment, whereby the pleated webs are connected series-wise to one another, FIG. 5 shows a flat view of the assembled sunblind from FIG. 4 with the running of tensioning cords and operating cords indicated schematically therein, FIG. 6 shows an upright front view of a third embodiment.

Shown in the FIGS. 1-3 inclusive is a sunblind which is arranged between a curved skylight, whereby in FIG. 1 the frame 1 is drawn schematically. The glass panels or other transparent material are omitted here for the sake of clarity.

The frame 1 consists of a horizontal framework of for instance rectangular section, over the short side of which is placed an arcuate profile 2, the profile section of bars 1 and 2 is random and falls otherwise outside the scope of the invention.

The sunblind proposed according to the invention is formed with two support bars 3 and 4, which are identical in form and consist of a number of straight portions 5 positioned at an angle to one another such that the arcuate form of each support bar 3, 4 virtually corresponds to that of the arcuate profiles 2.

Arranged between each of the straight portions 5 located opposite one another is a web of sunblind material of, for instance, pleated material. This results in an assembled sunblind having webs of material arranged in parallel adjacent to one another, which, when for example the bar 4 is moved, will all simultaneously fold out or contract.

Arranged for a good guiding of bar 3 and/or 4 between the arcuate profiles 2 are tensioning cords 6, whereby in each case two tensioning cords 6 co-operating with a portion 5 are on the one hand attached to the profile 2, and on the other are connected to each other by a draw spring 7, see FIG. 3, such that a determined tensile force is generated in the cords 6 between both arcuate profiles 2. Bars 3, 4 are provided with suitable passage openings for feeding through the tensioning cords, so that the bars can be moved freely back and forth. The guide cords 6 can serve in addition as support for the material web, for example the pleated material, arranged between the portions 5, for which purpose each pleat of the material is provided with a passage opening through which is fed the cord 6.

For easy activation of the sunblind a number of operating cords are fitted, which can be reached for example from the floor area. The running of the operating cords is explained in FIG. 2. The starting point here are three cords 8, 9, 10 in loop form, each of which is fastened at a particular point A, B, C to for instance the arcuate bar 4, these points being uniformly distributed over the length of bar 4. As a result of simultaneous activation of the loop-form cords 8, 9, 10 the bar 4 can be moved back and forth between the support bar 3, which is here attached firmly to the foremost profile 2, and the arcuate profile 2 located opposite by pulling on either the one part or the other part of the downward hanging portion 11 of all the cords.

The FIGS. 4, 5 show a possible second embodiment, whereby the starting point is a number of webs of sunblind material, linked series-wise one after another in order to form an assembled blind of material. Arranged between each web portion 12 is a support bar 13 or 14. In the embodiment shown here three web portions are fitted, but it will be apparent that more or fewer can be used.

In the embodiment shown the bars 13, 14 are connected to each other, but it would be equally possible here to employ a single bar profile for this purpose.

In accordance with a feature of the invention at least one end of the bars 13, 14 is guided along an arcuate guiding 15. In the embodiment as in FIGS. 4 and 5 both ends are carried through an identical curve 15, which guiding 15 can for instance be a part of the skylight frame profile. Both arcuate guidings 15 are connected to each other by a transverse profile 16, see FIG. 5, which also forms part of the fixed frame profile.

It will be apparent that as a result of guiding the bars 13, 14 in a manner similar to that in FIG. 1 an arcuate skylight can be screened, not in lengthwise direction, however, but in transverse direction. The extent to which the curve is followed accurately is in large measure determined by the length of each web of material.

A characteristic aspect is that the web material is supported by tensioning cords 17 arranged between bars 13, 14, each of which cords is placed under pre-tension by a spring-mounted member 18, here for example a spiral spring accommodated in one of the bars.

For central operation, that is, for screening of the opening to a greater or lesser extent, at least one of the end bars, here bar 14, is attached to two operating cords 19, 20 in loop form, whereby each operating cord is wound round a pulley 21 fitted on the other end bar, here bar 13.

As a result of pulling the loop-form operating cords on either the one part or the other part, bar 14 slides along the guiding 15 in a respectively upward or downward direction, whereby the distribution of the intermediate bars 13, 14 will remain uniform owing to the use of the tension springs 18.

Although not strictly essential, the operating cords in the embodiment shown are also guided through holes running through the ends of each intermediate bar 13, 14.

FIG. 6 shows a third embodiment suitable for the embodiment as according to FIGS. 4 and 5.

In this case also the webs of material are formed series-wise one after another into an assembled blind. The intermediate bars 13, 14 arranged on either side of each web portion 12 are attached for pivoting on one end at 22 to a support construction that is not explained further. The other end of the intermediate bars 13, 14 is carried slidably along an arcuate guiding 23. Each web of material is again supported by tensioning cords 17 arranged between the bars, these cords being pre-tensioned by means of a draw spring 18 as according to the embodiment in FIG. 5.

By moving one of the end bars, for example bar 14 on the left in FIG. 6, back and forth in the direction of the arrow $P_1$ a circle segment-shaped opening can be screened off.

As a result of the use of the pleated material the part segments can easily be filled up.

The invention is not limited to the embodiments described above. It is thus also possible in the embodiment from FIG. 4 to employ a bar in arcuate form as in FIG. 1 without detracting from the idea of the invention. The running of the tensioning cords and operating cords as shown can likewise be formed otherwise in an appropriate manner.

I claim:

1. A curved sunblind assembly for covering a curved area comprising a pair of support bars, each of said bars having a generally curved configuration, one of said bars being movable relative to the other of said bars, a plurality of separate webs of pleated material each of which includes a plurality of pleats and having opposite edges, the opposite edges of each of said webs being secured to said pair of bars, a plurality of tensioning cords extending between said pair of bars, each of said webs being supported between the opposite edges thereof by at least one of said cords, resilient means connected to each of said cords for maintaining the cords in tensioned condition, means for moving the bars between a blind-opening position in which the bars are in closely spaced relation and a blind-closing position in which the bars are spaced apart, the webs being flattened when the bars are in blind-closing position to define a plurality of flattened sections of the curved sunblind, the outer peripheries of the pleats of each of said sections in the blind-closing position lying generally in a plane, the plane of each of said sections being disposed at an angle to the plane of an adjacent section, each of said planes defining a chord of a curve.

2. An assembly as defined in claim 1 wherein said bars are of similar construction, each of said bars including a plurality of substantially straight portions disposed at an angle relative to one another to define said generally curved configuration, each of said webs having the opposite edges thereof secured to corresponding straight portions of the pair of bars.

3. An assembly as defined in claim 1 wherein a plurality of said cords are operatively associated with said movable bar to guide movement thereof relative to the other of said bars.

4. A curved sunblind assembly for covering a curved area comprising a plurality of support bars movable relative to one another, a plurality of separate webs of pleated material each of which includes a plurality of pleats and having opposite edges, the opposite edges of each of said webs being secured to adjacent bars, a plurality of tensioning cords each of which extends between adjacent bars and supports one of said webs between the opposite edges thereof, at least one tensioning cord extending between each pair of adjacent bars, resilient means connected to each of said cords for maintaining the cords in tensioned condition, means for moving the bars between a blind-opening position in which the bars are in closely spaced relation and a blind-closing position in which the bars are spaced apart, said bars remaining substantially uniformly spaced apart from one another in all positions, the webs being flattened when the bars are in blind-closing position to define a plurality of flattened sections of the curved sunblind, curved guide means for guiding said bars in their movement relative to one another, the outer peripheries of the pleats of each of said sections in the blind-closing position lying generally in a plane, the plane of each of said sections being disposed at an angle to the plane of an adjacent section, each of said planes defining a chord of a curve.

5. An assembly as defined in claim 4 wherein at least one end of said bars slidably engages said guide means.

6. An assembly as defined in claim 4 wherein opposite ends of said bars slidably engage said guide means.

7. An assembly as defined in claim 4 including a plurality of additional cords each of which extends between adjacent bars and supports one of said webs between the opposite edges thereof, and resilient means connected with each of said additional cords for maintaining said additional cords in tensioned condition, said resilient means urging said bars together so that the bars uniformly move together and apart as the sunblind is actuated between blind-closing and blind-opening conditions.

8. A curved sunblind assembly for covering a curved area comprising a plurality of support bars movable relative to one another, a plurality of separate webs of pleated material each of which includes a plurality of pleats and having opposite edges, the opposite edges of each of said webs being secured to adjacent bars, a plurality of tensioning cords each of which extends between adjacent bars and supports one of said webs between the opposite edges thereof, resilient means connected to each of said cords for maintaining the cords in tensioned condition, means for moving the bars between a blind-opening position in which the bars are in closely spaced relation and a blind-closing position in which the bars are spread apart, the webs being flattened when the bars are in blind-closing position to define a plurality of flattened sections of the curved sunblind, one end of each of said bars being mounted for pivotal movement about a common axis, and curved guide means for guiding the movement of the opposite ends of each of said bars, the outer peripheries of the pleats of each of said sections in the blind-closing position lying generally in a plane, the plane of each of said sections being disposed at an angle to the plane of an adjacent section, each of said planes defining a chord of a curve.

9. An assembly as defined in claim 8 wherein the opposite end of each of said bars slidably engages said guide means.

10. An assembly as defined in claim 8 including an additional cord extending between adjacent bars and supporting each of said webs between the opposite edges thereof, and resilient means connected with each of said additional cords for maintaining said additional cords in tensioned condition, said resilient means urging said bars together so that the bars uniformly move together and apart as the sunblind is actuated between blind-closing and blind-opening conditions.

* * * * *